United States Patent
Tseng

(10) Patent No.: US 10,165,898 B2
(45) Date of Patent: Jan. 1, 2019

(54) COFFEE BEAN CONVEYANCE DEVICE

(71) Applicant: acaia Corporation, Cupertino, CA (US)

(72) Inventor: Rex Poway Tseng, Cupertino, CA (US)

(73) Assignee: ACAIA CORPORATION, Cupertino, CA (US)

( * ) Notice: Subject to any disclaimer, the term of this patent is extended or adjusted under 35 U.S.C. 154(b) by 0 days.

(21) Appl. No.: 15/624,782

(22) Filed: Jun. 16, 2017

(65) Prior Publication Data

US 2018/0296037 A1    Oct. 18, 2018

(30) Foreign Application Priority Data

Apr. 13, 2017 (TW) .............................. 106112365 A

(51) Int. Cl.
| | | |
|---|---|---|
| *A47J 42/50* | (2006.01) | |
| *B65G 33/14* | (2006.01) | |
| *B65G 33/34* | (2006.01) | |
| *B65G 43/08* | (2006.01) | |

(52) U.S. Cl.
CPC .............. *A47J 42/50* (2013.01); *B65G 33/14* (2013.01); *B65G 33/34* (2013.01); *B65G 43/08* (2013.01)

(58) Field of Classification Search
CPC ................................. A47J 42/50; B65G 33/14
USPC ...................... 198/550.1, 670, 671, 674, 677
See application file for complete search history.

(56) References Cited

U.S. PATENT DOCUMENTS

| | | | | | |
|---|---|---|---|---|---|
| 4,790,457 | A | * | 12/1988 | Morse ..................... | A47F 1/035 222/158 |
| 4,802,609 | A | * | 2/1989 | Morse ..................... | A47F 1/035 222/158 |
| 5,328,015 | A | * | 7/1994 | Volk, Jr. ................. | B65G 33/32 198/548 |
| 5,333,762 | A | * | 8/1994 | Andrews ................ | B65G 65/46 198/671 |
| 5,735,386 | A | * | 4/1998 | Epp ........................ | B65G 65/42 198/533 |
| 5,937,996 | A | * | 8/1999 | Friedman ............... | B65G 65/46 198/533 |
| 6,000,995 | A | * | 12/1999 | Ruholl ..................... | B24C 5/04 198/548 |
| 6,057,514 | A | * | 5/2000 | Maguire ............. | B01F 15/0445 177/105 |

(Continued)

*Primary Examiner* — Douglas A Hess
(74) *Attorney, Agent, or Firm* — Rabin & Berdo, P.C.

(57) ABSTRACT

A coffee bean conveyance device includes a conveying unit, a coffee bean holding unit and a driving mechanism. The conveying unit is a hollow member detachably assembled to the coffee bean holding unit, such that the coffee bean holding unit and the conveying unit are internally communicable with each other. The driving mechanism is eccentrically connected to the conveying unit, such that axes of the conveying unit and driving mechanism are parallelly spaced from each other. When the driving mechanism operates, coffee beans in the coffee bean holding unit are caused to stably move into the conveying unit and a constant weight or quantity of coffee beans is continuously fed to a coffee bean grinder or a coffee bean dispenser disposed below an outlet of the conveying unit. With these arrangements, the feeding of irregular weight or quantity of coffee beans to the coffee bean grinder or dispenser is avoided.

9 Claims, 8 Drawing Sheets

(56) References Cited

U.S. PATENT DOCUMENTS

| | | | | |
|---|---|---|---|---|
| 6,254,374 B1* | 7/2001 | Hatfield | ............. | B29C 47/10 |
| | | | | 366/76.3 |
| 6,774,318 B2* | 8/2004 | Beal | ............. | B01F 3/18 |
| | | | | 177/105 |
| 7,748,575 B2* | 7/2010 | Hanaoka | ............. | B65G 33/22 |
| | | | | 222/240 |
| 8,408,382 B2* | 4/2013 | Pano | ............. | A47J 31/404 |
| | | | | 198/550.01 |
| 8,757,865 B2* | 6/2014 | Pankoke | ............. | B65G 33/18 |
| | | | | 198/457.04 |
| 9,193,530 B2* | 11/2015 | Trudslev | ............. | B65G 65/46 |
| 9,363,944 B2* | 6/2016 | Shaffer | ............. | A01C 15/02 |
| 9,434,551 B2* | 9/2016 | Mellander | ............. | B30B 9/127 |

* cited by examiner

COFFEE BEAN CONVEYANCE DEVICE

FIELD OF THE INVENTION

The present invention relates to a conveyance device, and more particularly, to a coffee bean conveyance device that can stably move a constant quantity of coffee beans to a coffee bean grinder or coffee bean dispenser.

BACKGROUND OF THE INVENTION

The world's cuisine culture is changing, diversified food ingredients are available, and a variety of ways for cooking food has been developed. To provide diversified liquid drinks in a convenient manner, many specific systems and methods for this purpose have also been developed.

Particularly, coffee has become one of the most popular beverages in the modern society. Currently, specialty coffee stores are common in the market to sell coffee-related products. When a consumer orders a cup of coffee in a specialty coffee store, the operator first takes out from a coffee bean container a quantity of coffee beans substantially sufficient for making a cup of coffee and then grinds the coffee beans and brews coffee. The brewed coffee is then served to the consumer. The quantity of coffee beans taken out from the container each time often varies with different operators who are different in the experience of brewing coffee. In the event too many coffee beans are taken out from the container at a time, it is possible the brewed coffee would taste too strong to be welcomed by the consumer. Further, in the event too many coffee beans are ground at a time, it is possible not all the ground coffee beans are used to make a cup of coffee. The extra ground coffee beans are usually discarded to form unnecessary waste and increase the material cost of the coffee store. On the other hand, in the event an insufficient quantity of coffee beans is taken out from the container for making a cup of coffee, the brewed coffee might taste too light and the operator might have to discard it and make another cup of coffee. This would also increase the material cost of the coffee store.

There are specialty coffee stores that sell their home-brand roasted coffee beans. The store usually manually weighs and dispenses the roasted coffee beans according to the quantity the consumer ordered. The manual dispensing of coffee beans requires high labor cost and can not be fast and accurately done to meet the same quantity of coffee beans ordered by the consumer.

To overcome the above problems, a coffee bean dispenser has been developed and introduced into the market. However, the currently available coffee bean dispenser uses a conveyor belt to convey the coffee beans, making the coffee bean dispenser bulky in volume and not suitable for using on a bar counter. Besides, the coffee bean dispenser with the conveyor belt still fails to accurately control the quantity or weight of the coffee beans to be dispensed each time.

SUMMARY OF THE INVENTION

A primary object of the present invention is to provide a coffee bean conveyance device that can continuously supply a constant weight of coffee beans to a coffee bean grinder or a coffee bean dispenser according to actual need, so that the coffee bean grinder or dispenser can always grind or dispense a fixed weight or quantity of coffee beans each time to avoid unnecessary waste of coffee beans and reduce the material cost of brewing coffee.

To achieve the above and other objects, the coffee bean conveyance device provided according to a preferred embodiment of the present invention includes a conveying unit, a coffee bean holding unit, a driving mechanism, a control device and a weighing device. The conveying unit internally defines a conveyance passage extended along a first axis, and is provided with a bean inlet and a bean outlet, via which the conveyance passage is communicable with an environment outside the conveying unit. The bean inlet has a first length defined between two longitudinally spaced ends of the bean inlet and being larger than a diameter of the conveying unit; and the bean inlet further has a second length defined between two transversely spaced sides of the bean inlet and being smaller than the diameter of the conveying unit. The first length intersects with the second length. In the preferred embodiment of the present invention, the conveying unit has a longitudinal length more than four times of the diameter of the conveying unit.

The coffee bean holding unit is assembled to the bean inlet and internally defines a storage space for holding an amount of coffee beans therein, so that the storage space is communicable with the conveyance passage and the coffee beans held in the storage space can move from the storage space into the conveyance passage via the bean inlet. The coffee bean holding unit has a movable stop plate assembled thereto to move between a closed position, in which the movable stop plate blocks the bean inlet, and an opened position, in which the storage space is allowed to communicate with the conveyance passage.

The driving mechanism includes a driving source, a coil spring and a releasable mounting unit located between the driving source and the coil spring. The driving mechanism is eccentrically connected to the conveying unit, and the driving source drives the coil spring to rotate relative to a second axis, which is in parallel with and spaced from the first axis. The rotating coil spring is able to move the coffee beans in the conveyance passage toward the bean outlet. With the releasable mounting unit, the driving source is detachably connected to the conveying unit. In the preferred embodiment, the releasable mounting unit includes a sleeve and two magnetic elements. The sleeve is assembled to an end of the coil spring; one of the two magnetic elements is mounted in the sleeve while the other one is mounted to a rotary shaft of the driving source, such that the sleeve is detachably connected to and fitted around the rotary shaft due to a magnetic attraction force between the two magnetic elements.

The control device is electrically connected to the driving mechanism and has a preset weight data stored therein. The weighing device is electrically connected to the control device for measuring a total weight of the coffee beans having been moved to the bean outlet by the coil spring and fallen onto a container disposed on the weighing device. The weighing device then generates a measured weight data to the control device. The control device stops the driving mechanism from operating when the measured weight data sent thereto is the same as the preset weight data stored in the control device.

In summary, the present invention is characterized in that the driving mechanism is eccentrically connected to the conveying unit, so that the coil spring is driven by the driving source to rotate about the second axis that is parallelly spaced from the first axis of the conveyance passage. With these arrangements, the rotating coil spring can move the coffee beans in the conveyance passage toward the bean outlet at a constant speed, and the weight or quantity of the coffee beans supplied to the coffee bean grinder or dispenser in this manner can maintain constant to avoid unnecessary waste of coffee beans and reduce the material cost of brewing coffee.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
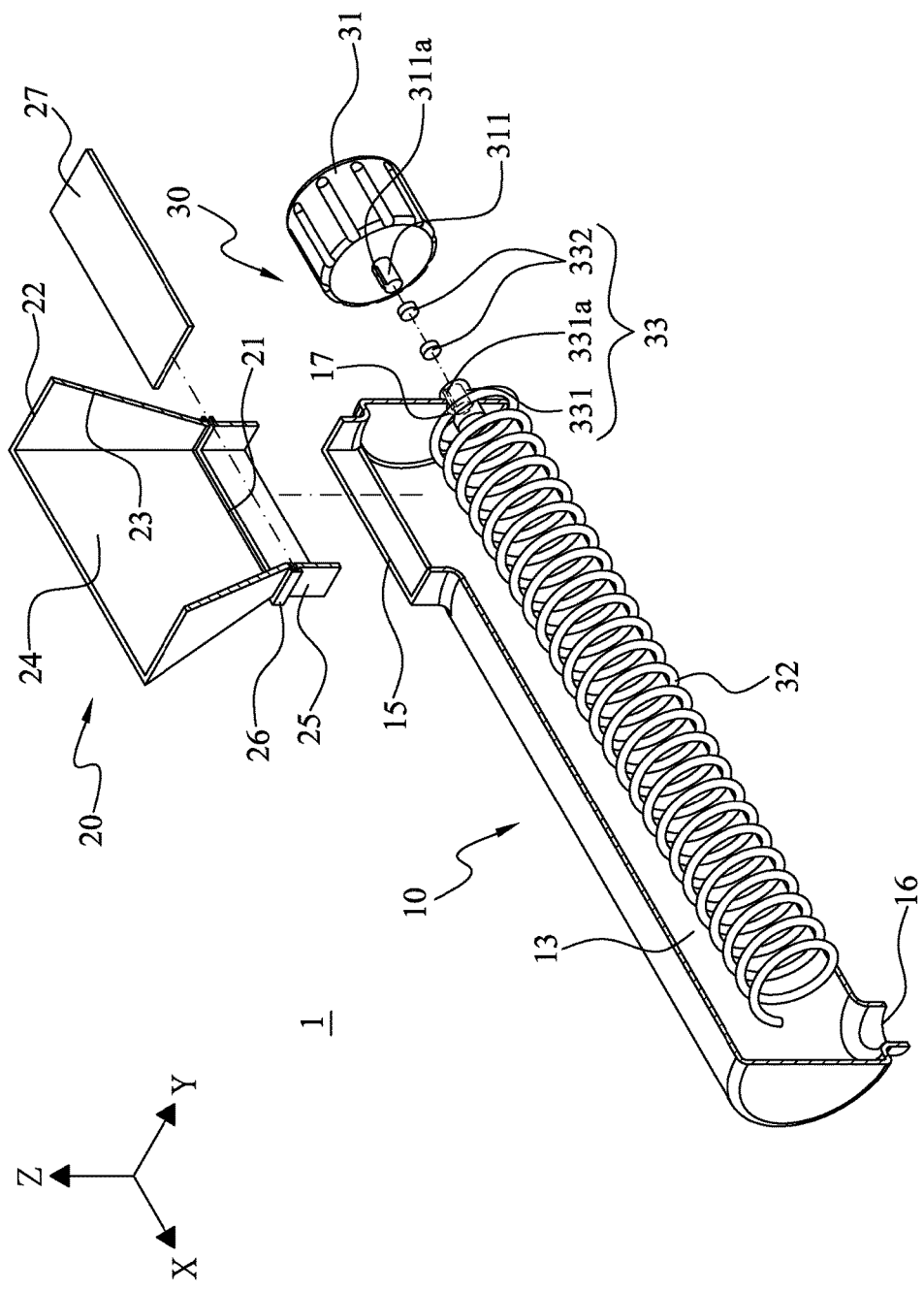
FIG. 1 is an exploded perspective view of a coffee bean conveyance device according to a first preferred embodiment of the present invention.

The present invention will now be described with some preferred embodiments thereof and by referring to the accompanying drawings. For the purpose of easy to understand, elements that are the same in the preferred embodiments are denoted by the same reference numerals.

Figure 2:
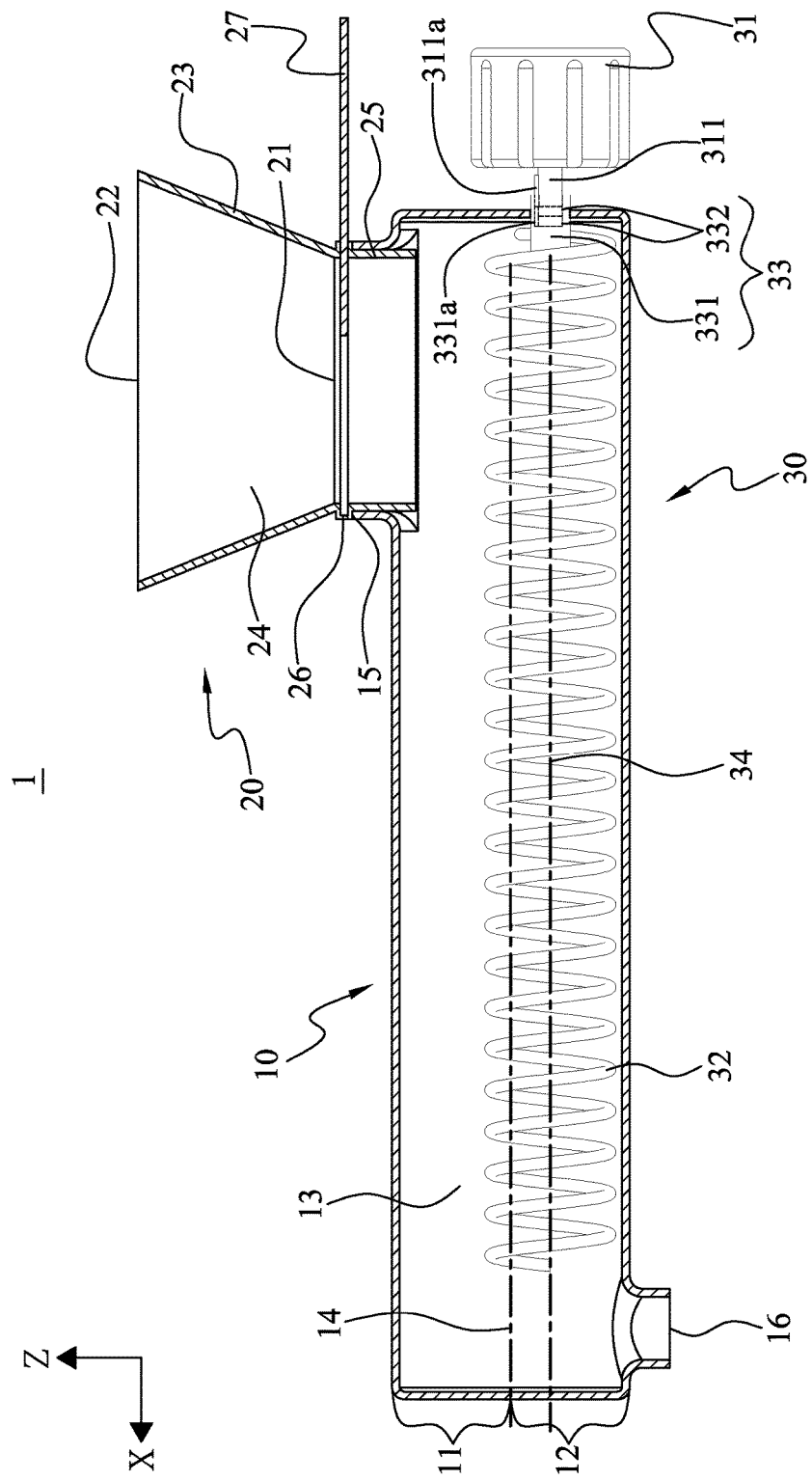
FIG. 2 is an assembled sectional view of the coffee bean conveyance device of FIG. 1.

Please refer to FIGS. 1 and 2. A coffee bean conveyance device 1 according to a first preferred embodiment of the present invention includes a conveying unit 10, a coffee bean holding unit 20 and a driving mechanism 30. The conveying unit 10 is configured as an elongated cylindrical pipe having a length more than four times of a diameter thereof. More specifically, the conveying unit 10 has an upper concave case 11 and a lower concave case 12 located below the upper concave case 11, which together define a conveyance passage 13 inside the conveying unit 10. The conveyance passage 13 has a center line in parallel with the x-axis and is defined as a first axis 14 of the conveyance passage herein. As shown, the upper concave case 11 is provided with a bean inlet 15 communicable with the conveyance passage 13, and the lower concave case 12 is provided with a bean outlet 16 oriented in parallel with the z-axis as well as a shaft hole 17 oriented in parallel with the x-axis. Both of the bean outlet 16 and the shaft hole 17 are communicable with the conveyance passage 13. With these arrangements, the conveyance passage 13 is communicable with an environment outside the conveying unit 10 via the bean inlet 15 and the bean outlet 16. It is noted the bean inlet 15 and the bean outlet 16 are arranged at two diagonally opposite ends of the conveying unit 10.

Figure 3:
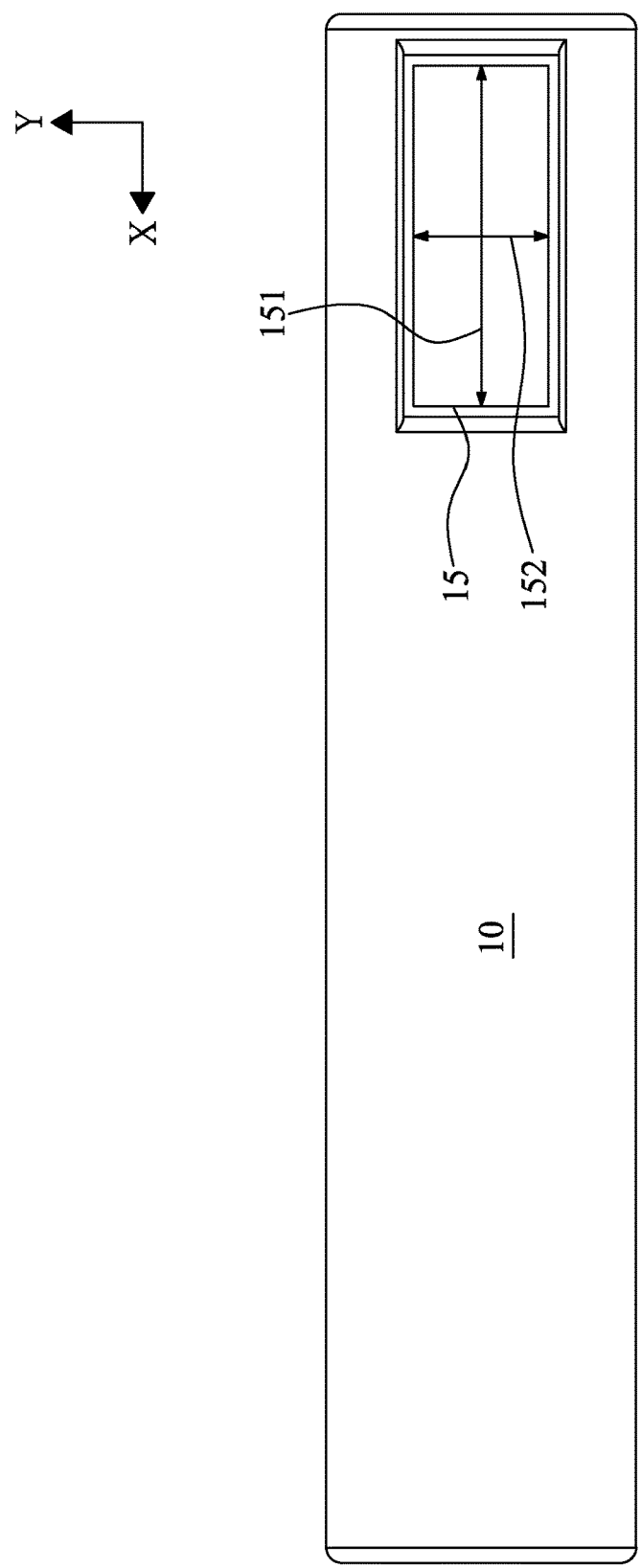
FIG. 3 is a schematic top view of a conveying unit of the coffee bean conveyance device of FIG. 1 showing a bean inlet formed thereon.

Referring to FIG. 3. The bean inlet 15 has a first length 151 in parallel with the x-axis and defined between two longitudinally spaced ends of the bean inlet 15. The first length 151 is larger than the diameter of the conveying unit 10. The bean inlet 15 further has a second length 152 in parallel with the y-axis and defined between two transversely spaced sides of the bean inlet 15. The second length 152 is smaller than the diameter of the conveying unit 10. As can be seen in FIG. 3, the first length 151 and the second length 152 intersect at right angle, giving the bean inlet 15 a rectangular configuration. However, it is understood the rectangular shape of the bean inlet 15 is only illustrative and, in other operable embodiments, the bean inlet 15 can be, for example, oblong in shape.

Please refer back to FIGS. 1 and 2. The coffee bean holding unit 20 has a first opening 21 corresponding to the bean inlet 15, and a second opening 22 located above the first opening 21. The first opening 21 flares toward the second opening 22, so that the coffee bean holding unit 20 has a substantially inverted, truncated pyramidal peripheral wall 23, which internally defines a storage space 24 communicating the first opening 21 with the second opening 22. Further, the coffee bean holding unit 20 downward extends from the first opening 21 to form a neck portion 25, which can be extended into the bean inlet 15. A peripheral wall of the neck portion 25 is partially horizontally outward extended to form a hollow abutting section 26 around the neck portion 25, and the abutting section 26 is adapted to abut on an outer surface of the conveying unit 10.

Figure 4A:
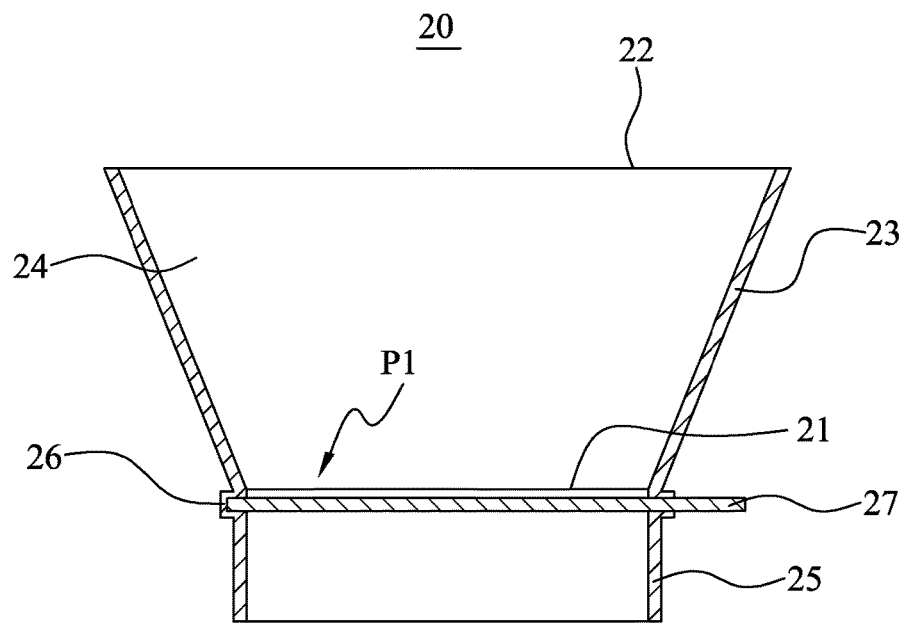
FIG 4A is a schematic sectional view of a coffee bean holding unit of the coffee bean conveyance device of FIG. 1 with a movable stop plate thereof located at a closed position.
Figure 4B:
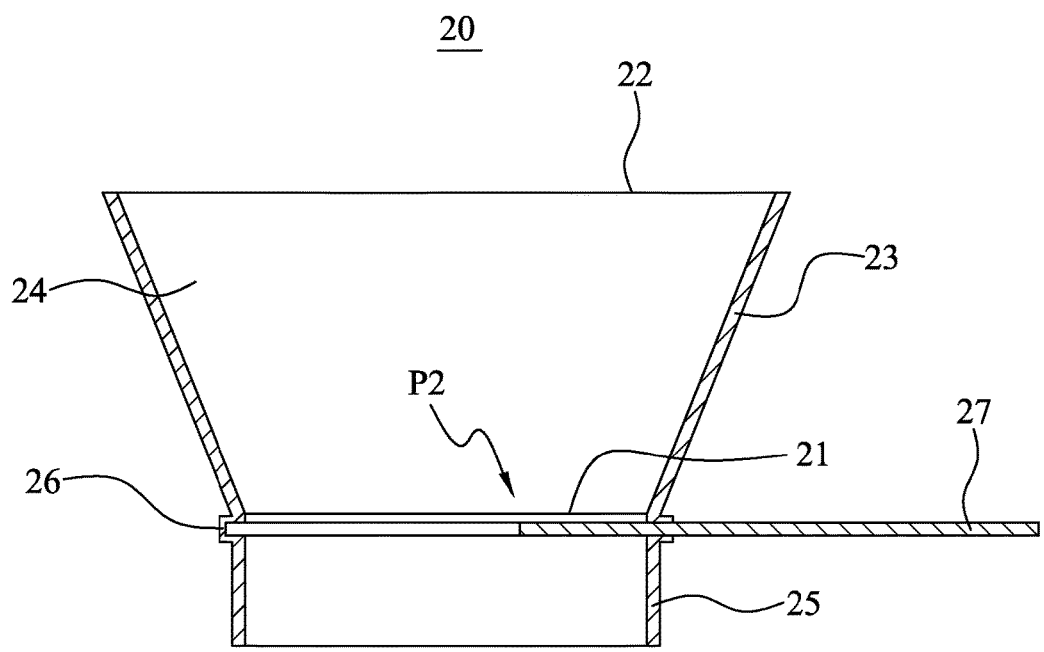
FIG. 4B is another schematic sectional view similar to FIG. 4A with the movable stop plate located at an opened position.

As shown in FIGS. 4A and 4B, a movable stop plate 27 is disposed in the neck portion 25 to couple with the hollow abutting section 26 and is movable between a closed position P1 and an opened position P2 relative to the neck portion 25. In the closed position P1, the movable stop plate 27 blocks the entire bean inlet 15 and stops the storage space 24 from communicating with the conveyance passage 13. On the other hand, the movable stop plate 27 in the opened position P2 does not block or blocks only part of the bean inlet 15, allowing the storage space 24 to communicate with the conveyance passage 13 via the bean inlet 15.

As shown in FIGS. 1 and 2, the driving mechanism 30 includes a driving source 31 and a coil spring 32. The driving source 31 is connected to the coil spring 32 via a releasable mounting unit 33 and can therefore be selectively connected to or detached from the coil spring 32. The driving source 31 serves to rotate the coil spring 32 about a second axis 34, which is the center line of the coil spring 32. The coil spring 32 is made of an elastic material and is therefore deformable when being pushed or pulled by an externally applied force. On the other hand, the coil spring 32 normally keeps its original shape when it is not subjected to any external force.

In the illustrated first preferred embodiment, the driving source 31 includes a rotary shaft 311 having a radially outward section to serve as a locating protrusion 311a, and the releasable mounting unit 33 includes a sleeve 331 for fitting in the shaft hole 17. The sleeve 331 is assembled to an end of the coil spring 32 closer to to the bean inlet 15 and is internally formed with a locating recess 331a corresponding to the locating protrusion 311a. A magnetic element 332 is mounted to a free end of the rotary shaft 311 and another magnetic element 332 is mounted in the sleeve 331. When the locating protrusion 311a is aligned and engaged with the locating recess 331a, the two magnetic elements 332 magnetically attract each other and bring the sleeve 331 to fit around and detachably connected to the rotary shaft 311. Therefore, with the releasable mounting unit 33, the driving source 31 can be selectively connected to or separated from the conveying unit 10

As can be seen in FIG. 2, the driving mechanism 30 is eccentrically connected to the conveying unit 10 with the driving source 31 being located outside the conveying unit 10 and the coil spring 32 located in the conveyance passage 13. Further, the second axis 34 is located to one side of the first axis 14. That is, the first and the second axis 14, 34 are parallelly spaced from each other instead of being the same line. Therefore, the coil spring 32 is located in the conveying unit 10 closer to the lower concave case 12 and farther from the upper concave case 11.

Figure 5A:
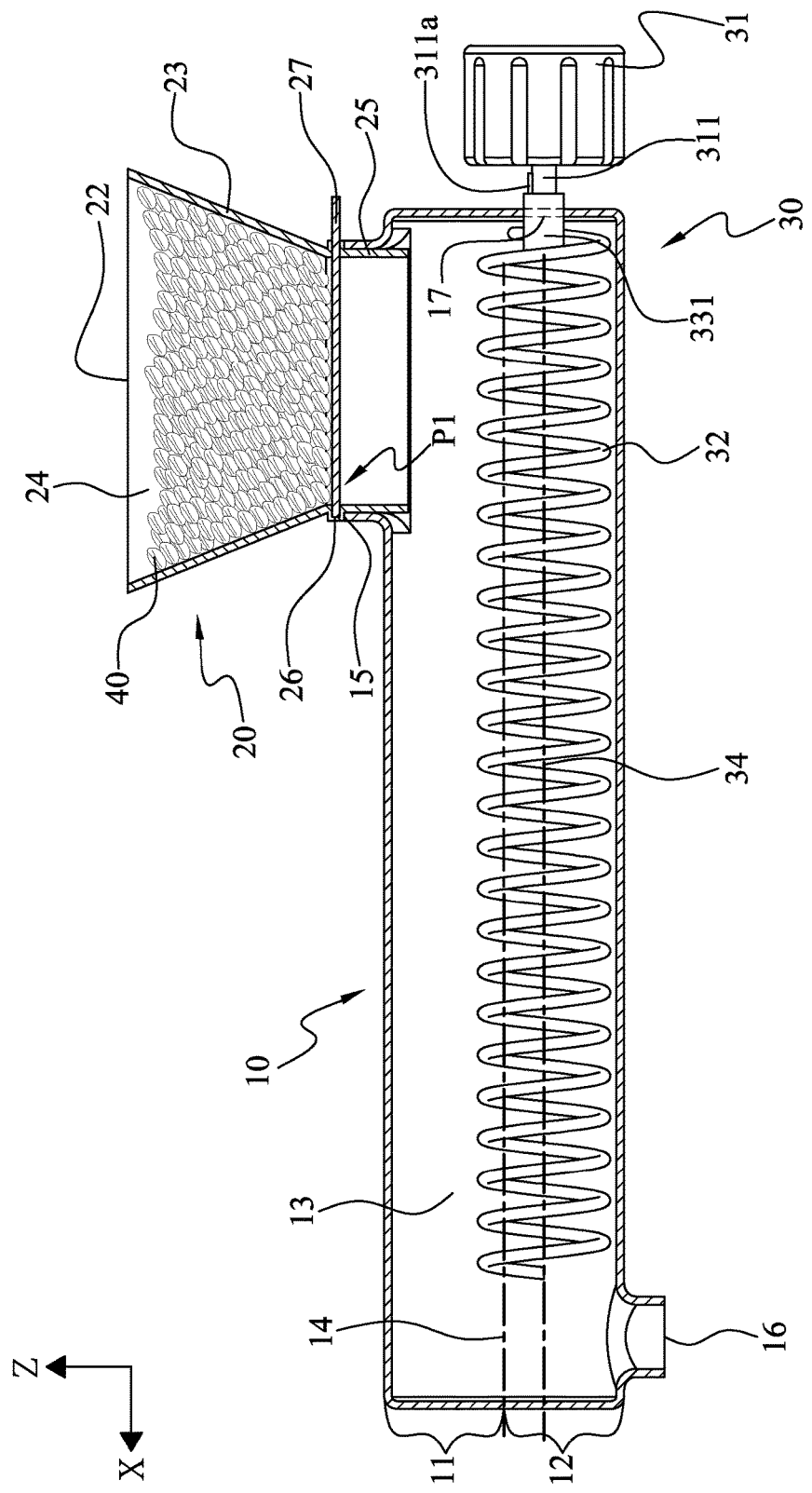
FIG. 5A is a sectional side view of the coffee bean conveyance device of FIG. 1 showing an amount of coffee beans is held in the coffee bean holding unit.

Please refer to FIG. 5A. In practical use of the coffee bean conveyance device 1, first position a coffee bean grinder (not shown) or a coffee bean dispenser (not shown) below the bean outlet 16. Then, shift the movable stop plate 27 relative to the abutting section 26 to the closed position P1 in order to block the bean inlet 15. Thereafter, pour an amount of coffee beans 40 into the storage space 24 of the coffee bean holding unit 20 via the second opening 22 thereof. Since the bean inlet 15 of the conveying unit 10 is blocked by the movable stop plate 27, the coffee beans 40 could not move into the conveyance passage 13 of the conveying unit 10.

Figure 5B:
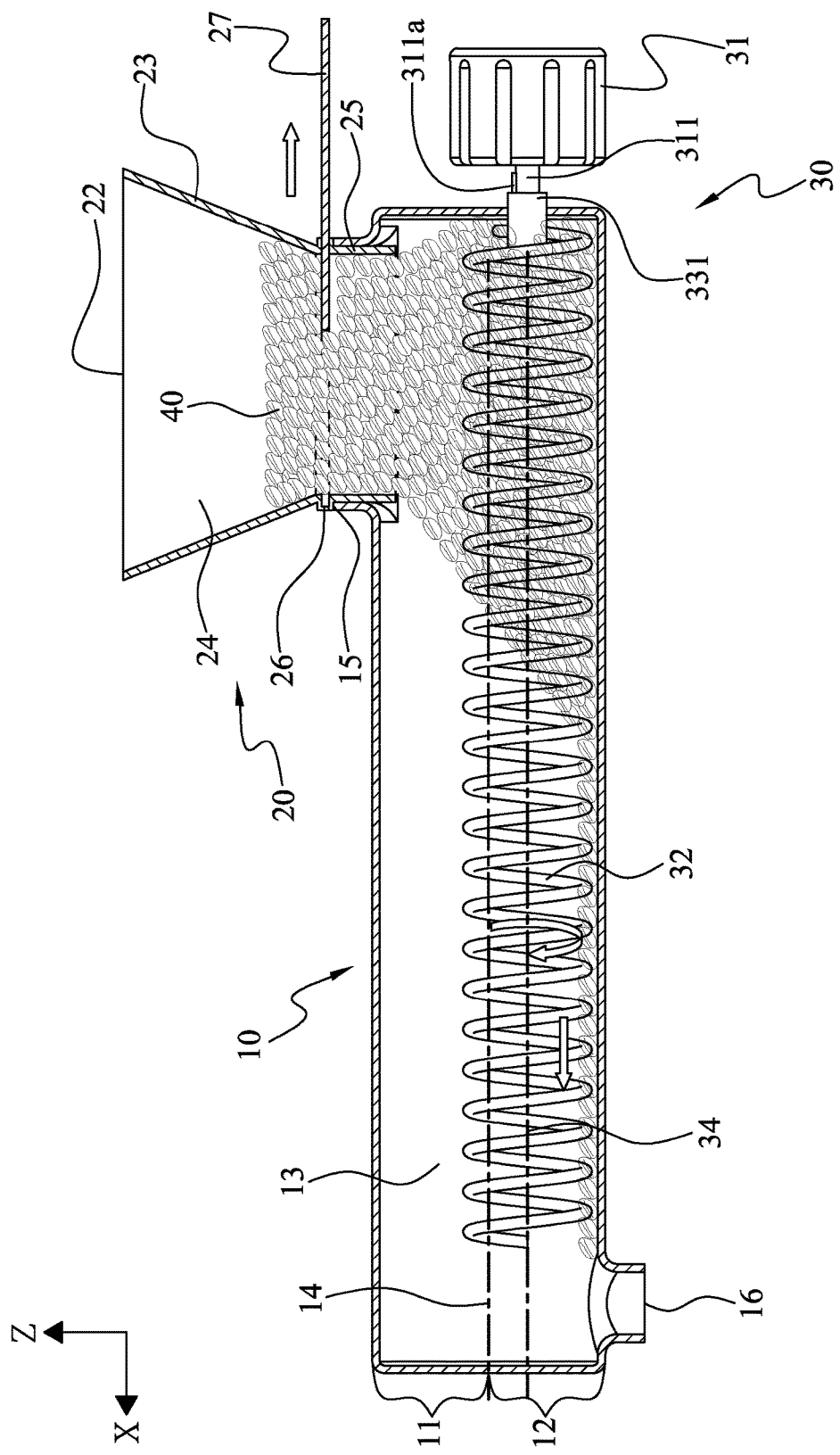
FIG. 5B is another sectional side view of the coffee bean conveyance device of FIG. 1 showing the coffee beans held in the coffee bean holding unit are moved by a coil spring toward a bean outlet.

Referring to FIG. 5B. Then, pull the movable stop plate 27 from the closed position P1 to the opened position P2 in order to fully or partially open the bean inlet 15. At this point, the coffee beans 40 are allowed to fall from the storage space 24 of the coffee bean holding unit 20 into the conveyance passage 13 of the conveying unit 10. Since the conveying unit 10 is in the form of an elongated cylindrical pipe, the coffee beans 40 just fallen into the conveyance passage 13 do not immediately leave the conveying unit 10 via the bean outlet 16 but stay at the conveyance passage 13. Then, start the driving mechanism 30 and the driving source 31 will drive the coil spring 32 to rotate about the second axis 34. The rotating coil spring 32 moves the coffee beans 40 in the conveyance passage 13 toward the bean outlet 16 at a constant speed, so that a constant quantity of coffee beans 40 each time can always be supplied to the coffee bean grinder or the coffee bean dispenser for grinding or dispensing.

Being made of an elastic material, the coil spring 32 is deformable in response to the position of the coffee beans 40 while it rotates in the conveyance passage 13. In this manner, it is able to avoid the risk of crashing the coffee beans 40 by the coil spring 32 when the latter rotates.

Figure 6:
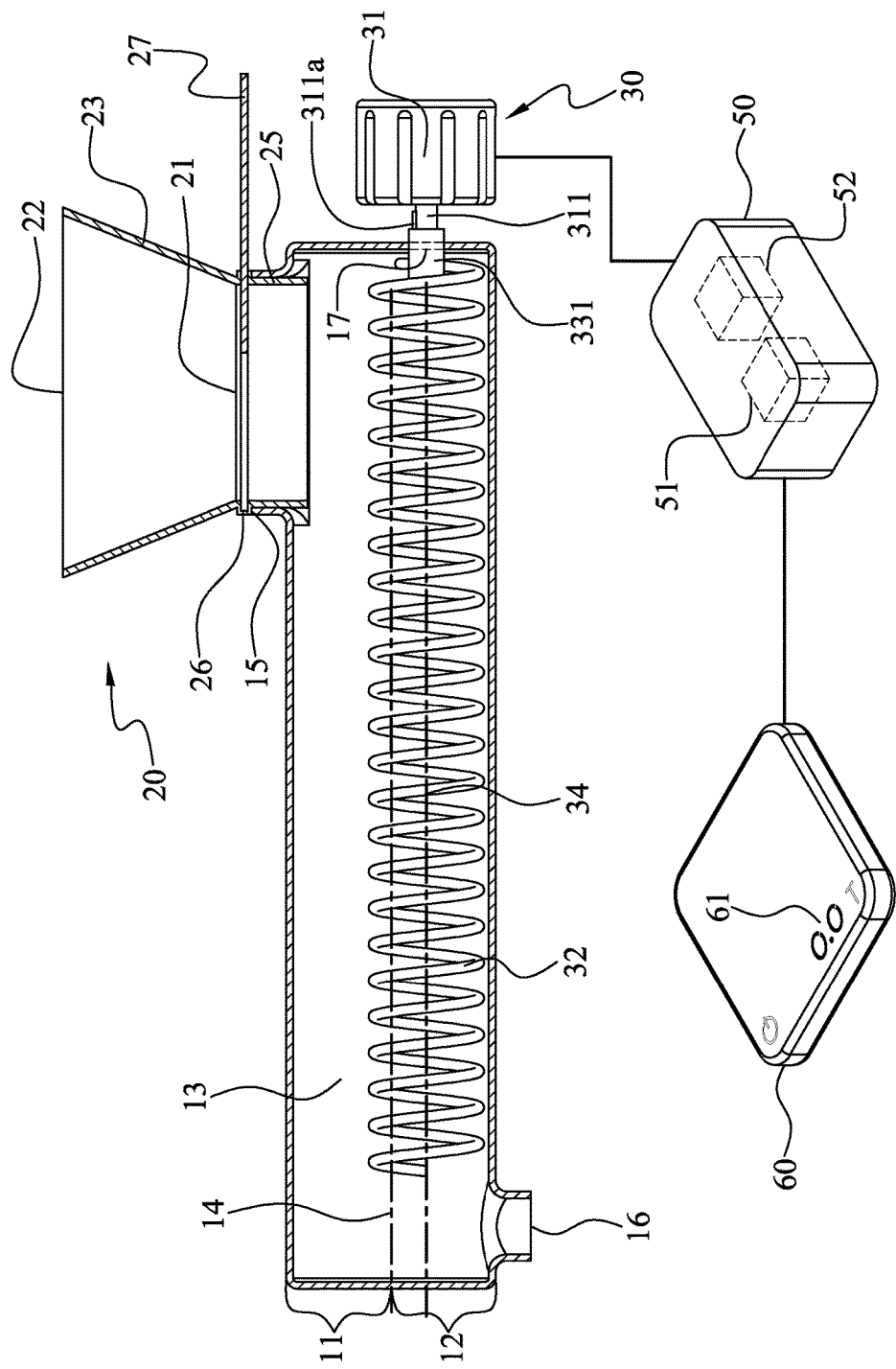
FIG. 6 is a systematic view of a coffee bean conveyance device according to a second preferred embodiment of the present invention.

FIG. 6 is a systematic view of a coffee bean conveyance device 1 according to a second preferred embodiment of the present invention. The second preferred embodiment is different from the first one in further including a control device 50 and a weighing device 60. That is, the coffee bean conveyance device according to the second preferred embodiment of the present invention consists of a conveying unit 10, a coffee bean holding unit 20, a driving mechanism 30, a control device 50 and a weighing device 60. Since the conveying unit 10, the coffee bean holding unit 20 and the driving mechanism 30 in the second preferred embodiment are structured and arranged in the same way as the first preferred embodiment, they are not repeatedly described herein.

The control device 50 is electrically connected to the driving mechanism 30 and internally provided with a storage unit 51 and a determination unit 52. The storage unit 51 is used to store at least one preset weight data therein. The weighing device 60 is electrically connected to the control device 50 and serves to measure the weight of coffee beans 40 sent thereto.

Figure 7:
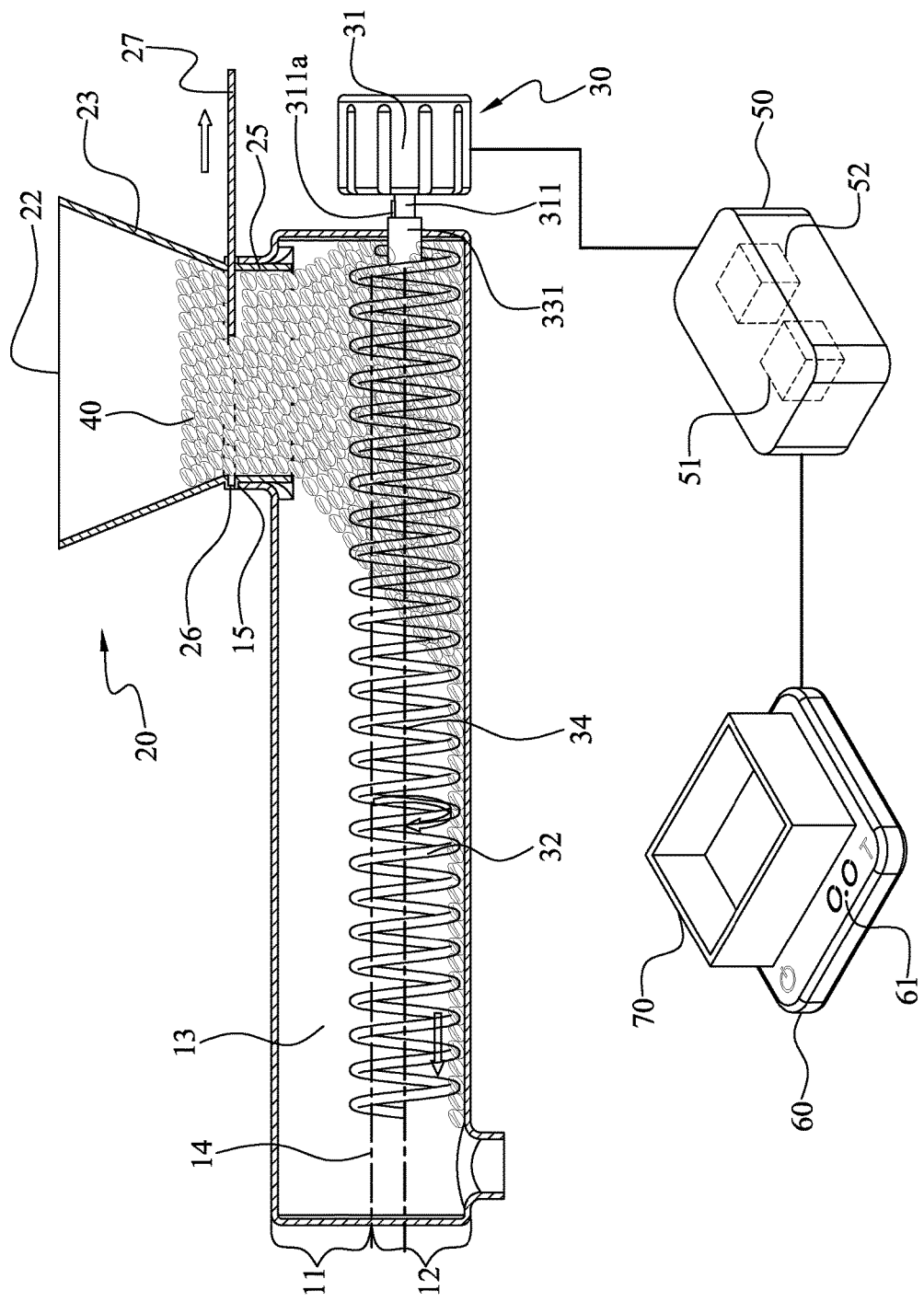
FIG. 7 shows the coffee bean conveyance device according to the second preferred embodiment of the present invention in operation.

Please refer to FIG. 7. In practical use of the coffee bean conveyance device according to the second preferred embodiment of the present invention, first position a container 70 on the weighing device 60 and reset the weighing device 60 to zero. At this point, a digital number of 0 is shown in a display screen 61 of the weighing device 60. Thereafter, start the driving mechanism 31 for driving the coil spring 32 to rotate about the second axis 34, so that the coffee beans 40 in the conveyance passage 13 are moved to the bean outlet 16 and fall into the container 70. At this point, the weighing device 60 immediately generates and transmits a measured weight data to the control device 50. The determination unit 52 compares the measured weight data with the preset weight data. In the case the comparison result indicates the measured weight data is not the same as the preset weight data, the driving source 31 will keep driving the coil spring 32 to rotate and move the coffee beans 40 toward the bean outlet 16. On the other hand, in the case the measured weight data is the same as the preset weight data, the determination unit 52 will order the driving source 31 to stop operating, so that the coffee beans 40 are no longer moved toward the bean outlet 16 to fall into the container 70. At this point, the coffee beans 40 in the container 70 can be poured into the coffee bean grinder or the coffee bean dispenser for grinding or dispensing.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A coffee bean conveyance device, comprising:
   a conveying unit internally defining a conveyance passage having a first central axis, and having a bean inlet and a bean outlet provided at two diagonally opposite ends of the conveyance passage, the conveying unit extending along the first central axis;
   a coffee bean holding unit being communicably assembled to the bean inlet and internally defining a storage space for holding an amount of coffee beans therein, so that the coffee beans held in the storage space can move from the storage space into the conveyance passage via the bean inlet; and
   a driving mechanism including a coil spring eccentrically disposed in the conveyance passage, the coil spring having a second central axis, which is in parallel with and spaced from the first central axis, the coil spring extending along the second central axis, and being connected at an end closer to the bean inlet to a driving source, which serves to drive the coil spring to rotate about the second central axis in the conveyance passage, the coil spring while being rotated by the driving source being able to move the coffee beans in the conveyance passage toward the bean outlet, the coil spring being made of an elastic material, the second central axis being below the first central axis so that the coil spring is close to a bottom of the conveyance passage.

2. The coffee bean conveyance device as claimed in claim 1, wherein the bean inlet has a first length defined between two longitudinally spaced ends of the bean inlet, and the first length is larger than a diameter of the conveying unit; wherein the bean inlet further has a second length defined between two transversely spaced sides of the bean inlet, and the second length is smaller than the diameter of the conveying unit; and wherein the first length intersects with the second length.

3. The coffee bean conveyance device as claimed in claim 1, wherein the coffee bean holding unit has a movable stop plate assembled thereto and adapted to be moved between a closed position, in which the movable stop plate blocks the bean inlet, and an opened position, in which the storage space is allowed to communicate with the conveyance passage.

4. The coffee bean conveyance device as claimed in claim 1, wherein the conveying unit has a longitudinal length more than four times of a diameter of the conveying unit.

5. The coffee bean conveyance device as claimed in claim 1, further comprising:
 a control device being electrically connected to the driving mechanism and having a preset weight data stored therein; and
 a weighing device being electrically connected to the control device for measuring a total weight of the coffee beans having been moved to the bean outlet by the coil spring and fallen into a container disposed on the weighing device, and then generating a measured weight data to the control device;
 wherein the control device stops the driving mechanism from operating when the measured weight data is the same as the preset weight data.

6. The coffee bean conveyance device as claimed in claim 1, wherein the driving mechanism further includes a releasable mounting unit connected to between the coil spring and the driving source, so that the driving source is detachably connected to the conveying unit.

7. The coffee bean conveyance device as claimed in claim 6, wherein the releasable mounting unit includes a sleeve and two magnetic elements; the sleeve being assembled to the end of the coil spring closer to the bean inlet; one of the two magnetic elements being mounted in the sleeve while the other one being mounted to a rotary shaft of the driving source, such that the sleeve is detachably connected to the rotary shaft due to a magnetic attraction force between the two magnetic elements.

8. The coffee bean conveyance device as claimed in claim 1, wherein the coil spring is made of an elastic material so that the coil spring is deformable in response to a position of the coffee beans while the coil spring is rotated in the conveyance passage.

9. The coffee bean conveyance device as claimed in claim 1, wherein the coil spring alone is configured to move the coffee beans in the conveyance passage toward the bean outlet while the coil spring is rotated by the driving source.

* * * * *